June 9, 1953  J. M. TRAMMELL  2,641,518
SPINDLE BEARING ASSEMBLY
Filed June 30, 1949
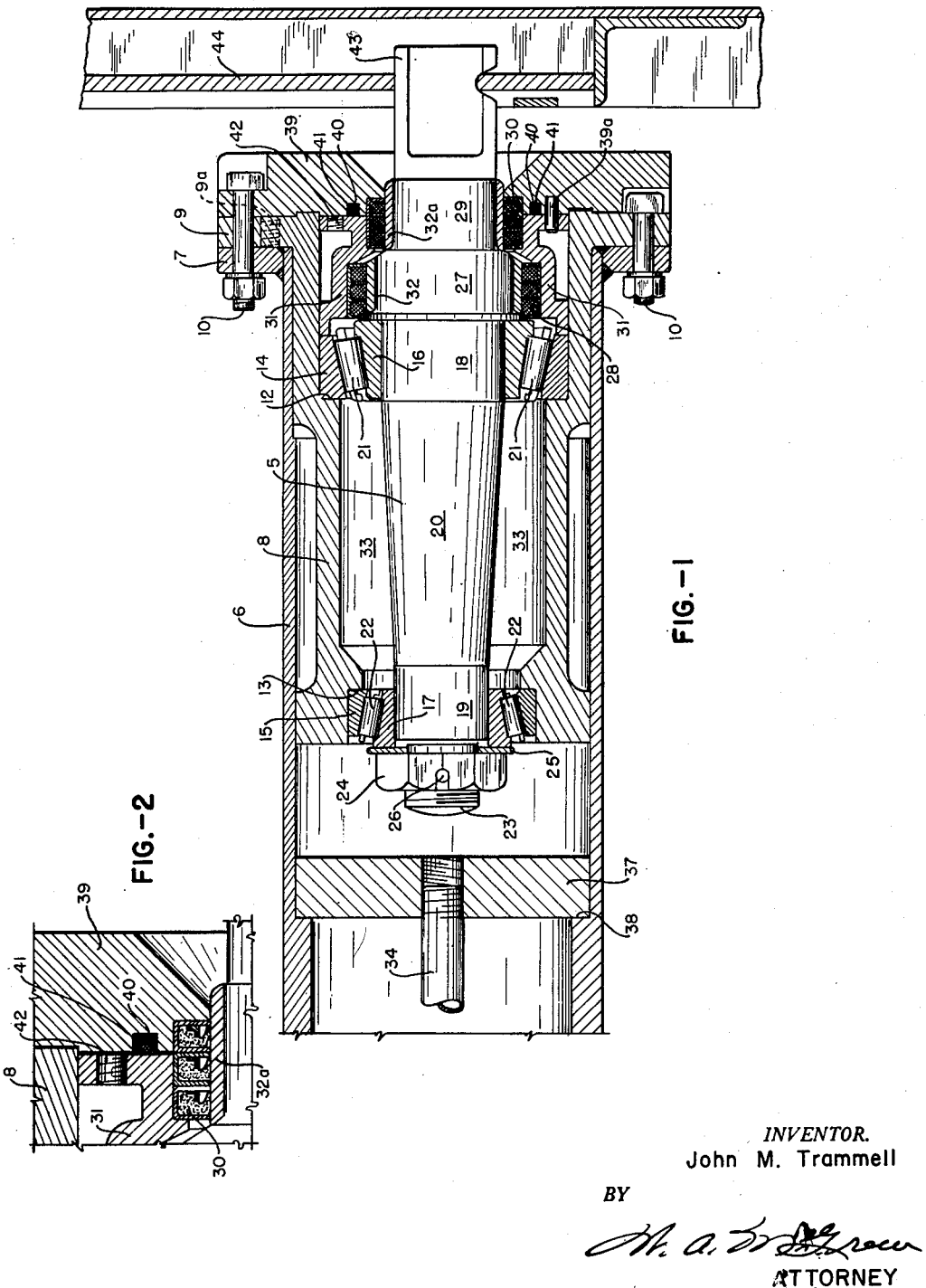
INVENTOR.
John M. Trammell
BY
*[signature]*
ATTORNEY Patented June 9, 1953

2,641,518

UNITED STATES PATENT OFFICE 2,641,518

SPINDLE BEARING ASSEMBLY

John M. Trammell, Denver, Colo., assignor to Colorado Iron Works Company, Denver, Colo., a corporation of Maine Application June 30, 1949, Serial No. 102,351

5 Claims. (Cl. 308—187.1)

The present invention relates to spindle bearing assemblies. It has to do particularly, although not exclusively, with spindle bearing assemblies which, in the operation of the machine of which they form a part, are partially or wholly submerged in a liquid or semi-liquid body of material under treatment. The present invention is an improvement upon that shown particularly in Fig. 8 of the drawings of the patent to Thomas A. Dickson No. 2,046,613 issued July 7, 1936. While the structure of the present invention may be effectively employed in other ways, it is particularly well adapted for use in the manner illustrated in the said Dickson patent.

One of the objects of the present invention is to provide an improved spindle bearing assembly of the foregoing character which is of relatively simple construction, practicable and extremely efficient in operation. The structure of the present invention has many advantages over the structure covered by the above-mentioned patent, it being a particular object and purpose of the present invention to provide an improved structure for partially submerged or wholly submerged use, having means which will effectively prevent the admission of grit and muck, and other foreign matter or particles, to the operating parts of the structure.

Another object of the present invention is to provide an improved structure as aforesaid having improved extra and more efficient sealing or packing means than previously known assemblies of the general nature of that of the present invention.

Other objects of the invention are to provide an assembly of the foregoing character which may be packed with grease or other lubricant without the possibility of producing a hydraulic action by which the parts may be displaced or by which the driving gear of such parts may be subjected to detrimental and injurious strains.

The foregoing and other objects and advantages of the present invention will appear from the following description and appended claims when considered in connection with the accompanying drawing forming a part of this specification, wherein like reference characters designate similar parts in the several views.

In said drawing:

Fig. 1 is an enlarged sectional elevation of a spindle bearing assembly embodying the present invention; and Fig. 2 is an enlarged fragmentary detail of a part of the improved sealing or packing means of the assembly.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to the drawing, the assembly shown therein comprises a spindle 5 constituting the stationary member of the structure, which carries the rotary element of the classifier or other machine (not shown) to which the assembly is applied.

The rotary element, as shown, is in the form of a hollow main shaft 6 having at its open end a ring or collar 7 and carrying a bushing or bearing carrier 8 which functions as a carrier for the thrust bearings by which the shaft is supported upon the spindle.

This bearing carrier 8 is driven into the hollow shaft to fit snugly within the end portion thereof and, as shown, it has an end flange 9 which engages the ring or collar 7 and to which it is rigidly connected by machine bolts, or the like 10.

The bearing carrier 8 is recessed at its opposed ends thereby providing shoulders 12 and 13 which determine the position inside the respective recesses, of the outer races 14 and 15 of two antifriction bearings. As shown, these two bearings are of the roller type. Their inner races 16 and 17 are driven onto cylindrical portions 18 and 19, respectively, of the spindle 5 at opposite sides of the conical or tapered body portion 20 of the same. The two roller bearings are of different sizes, the smaller one being at the free end of the spindle and the larger one being adjacent the end of the spindle at which it is supported in the manner described below.

The rollers 21 and 22 of the two bearings slant axially from the respective ends of the spindle inwardly, and it is to be noted particularly that the bearings function as thrust elements acting in opposed directions to cooperatively prevent longitudinal displacement of the spindle 5 within or relative to the rotary element which it supports.

The spindle and the rotary shaft 6 are thus constantly maintained in true axial coincidence. Any oscillatory or wabbling movement of the spindle is eliminated and any "pumping" action which, in other structures of similar character used heretofore, would tend to produce the hydraulic effect hereinbefore referred to, is effectively prevented.

The spindle 5 terminates at its free or inner end with a screw threaded stud or portion 23 for the reception of an adjusting nut 24 which, through the medium of a washer 25, bears upon the inner race 17 of the adjacent smaller roller bearing, thereby locating the parts in their proper relative positions. As seen in Fig. 1, a cotter pin 26 holds the nut 24 in its adjusted position.

At the opposite, free end of the spindle 5 adjacent the part which carries the inner end of the larger roller bearing, is a cylindrical extension 27 of relatively larger diameter which provides within the corresponding recess of the retainer member 31, an annular space for the application of a packing unit or assembly 28. The cylindrical extension 27 finds a bearing in a wear sleeve 32. Adjacent and beyond the cylindrical extension 27 is a somewhat smaller cylindrical extension 29 which provides within the corresponding recess in the retainer 31, an annular space for the application of another packing unit or assembly 30 which is generally similar to the packing 28. The cylindrical extension 29 finds a bearing, as shown, in a wear sleeve 32a. The preferably "Garlock" packings 28 and 30 together with the retainer 31, prevent the passage of liquid to and from the bearings through the end of the carrier.

It will be noted that in the construction herein disclosed, the larger roller bearing carries the main load of the rotary element in addition to taking any thrust on the spindle from the outside inwardly, while the smaller roller bearing takes any thrust in the opposite direction while supporting the inner end of the spindle 5 in an accurate central fixed position.

It is desirable to provide a more effective seal for the structure than is provided in the above-mentioned Dickson patent. For this purpose, and in addition to the second packing unit 30, a so-called packing flange or closure plate or cover 39 having a central opening is slipped over the flattened shank portion 43 of the spindle and finds a bearing or central seat upon the outer surface of wear sleeve 32a. To properly align the member 39 with the flanged end 9 of the bearing carrier and to maintain the parts so aligned, dowel pins 39a are provided which fit in member 39 and in similar recesses or holes in the outer flange of retainer 31. The inner face or surface of the packing flange or plate member 39 has a snug fit with the end portion 9 of the carrier and has an annular groove or recess 40 formed therein within which is located a ring or piece of felt or other packing 41. The groove 40 may, of course, be provided in the retainer member 31 instead of in member 39. It will be understood that the member or plate 39 is held rigidly to the remaining structure by the bolts 10 previously referred to. By virtue of this structure and the auxiliary seal or packing, it is virtually impossible for any liquid to pass to or from the bearings through the end of the carrier, or for any grit, muck, or other foreign matter or particles to enter the bearing assembly.

The outer flange of retainer member 31 is provided with one or more threaded openings 42 to receive bolts which may be used when it is desired to remove the retainer from the carrier.

Moreover, the flanged portion 9 of the bearing carrier is provided with one or more threaded holes 9a for the reception of set screws which are to be used only when it is desirable to remove the bearing carrier 8 from the main shaft 6.

In much the same manner as in the Dickson patent, the outer end of the spindle 5 is in the form of a flattened shank portion 43 which is supported in usual manner in a stirrup or hanger 44.

It will be understood that suitable gaskets (not shown) are preferably disposed between the ringlike member 7 and the flange 9 and also between the flange 9 and the end plate or packing flange 39 so as to seal the joints between these members or parts.

In practice, grease or other lubricant is fed to the bearings from a source of lubricant under pressure (not shown) through a pipe 34 which extends inside the hollow shaft 6 in axial coincidence with it. The pipe 34 is supported inside the shaft preferably by an angle brace (not shown) and by a disk or member 37 which, as shown, engages a shoulder 38 inside the shaft adjacent the relatively stationary bearing. The pipe 34 may be supported in position in much the same manner as is shown and described in the Dickson patent.

From the foregoing it will be seen that I have provided a spindle bearing assembly with packing or sealing means which produces a considerably more efficient structure from the standpoint of sealing the bearings, than has been known heretofore. As a matter of fact, the present structure is a considerable improvement over that of the above-mentioned Dickson patent. The improved assembly constituting the present invention is of relatively simple nature and the parts are capable of being assembled and/or dismantled with ease and facility.

I claim:

1. In a spindle bearing assembly having a hollow rotary main shaft, a spindle projecting into the end of the hollow shaft, a bearing carrier disposed within said hollow shaft, bearings located between the spindle and carrier, and a retainer member of stepped formation fitted into the outer end of the bearing carrier, the improvement which comprises a closure member engaging the bearing carrier and retainer member, spaced packing units of different diameters disposed between the spindle and the retainer member, and sealing means disposed between the retainer member and closure member, said sealing means comprising an annular groove located in one thereof and packing material located in the groove and engaging the other thereof.

2. In a spindle bearing assembly having a hollow rotary main shaft, a spindle projecting into the end of the hollow shaft, a bearing carrier disposed within said hollow shaft, bearings located between the spindle and carrier, an apertured disk fitted in the hollow rotary main shaft in the vicinity of the inner end of the spindle, a lubricant supply pipe having its inner end fitted in the aperture of said disk, and a retainer member fitted into the outer end of the bearing carrier, the improvement which comprises a closure member engaging the bearing carrier and retainer member, spaced packing units disposed between the spindle and the retainer member, and sealing means located between the retainer member and closure member, said sealing means comprising an annular groove formed in one thereof and packing material located in said groove and engaging the other thereof.

3. The improvement according to claim 2, wherein the annular groove is formed in the inner face of the closure member, and wherein the packing in said groove engages the adjacent face of said retainer member.

4. A spindle bearing assembly for submerged rotary elements, comprising a hollow rotary main shaft, a spindle projecting into the end of the hollow shaft, a bearing carrier disposed within said hollow shaft, bearings located between the spindle and carrier, said spindle having an enlarged diameter intermediate its ends, a retainer member of stepped formation disposed between the bearing carrier and spindle, and packing units of different diameters disposed lengthwise of the spindle between the same and the stepped retainer member to prevent the ingress of grit, muck, or the like to the interior of the spindle bearing assembly.

5. In a spindle bearing assembly for submerged rotary elements having a hollow rotary main shaft, a spindle projecting into the end of the hollow shaft, a bearing carrier disposed within said hollow shaft, bearings located between the spindle and carrier, said spindle having an enlarged diameter intermediate its ends; the improvement which comprises a retainer member of stepped formation disposed between the bearing carrier and spindle, packing units of different diameters disposed lengthwise of the spindle between the same and the stepped retainer member to prevent the ingress of grit, muck, or the like to the interior of the spindle bearing assembly, a closure member engaging the bearing carrier and retainer member, and sealing means between said bearing carrier and retainer member, said sealing means including an annular groove formed in one thereof and compressible packing material located in said groove and engaging the other thereof.

JOHN M. TRAMMELL.

References Cited in the file of this patent

UNITED STATES PATENTS

| Number | Name | Date |
|---|---|---|
| 2,046,613 | Dickson | July 7, 1936 |
| 2,253,754 | Bousman | Aug. 26, 1941 |
| 2,387,301 | Sanford | Oct. 23, 1945 |
| 2,429,516 | Jergens | Oct. 21, 1947 |